United States Patent
Huang

(10) Patent No.: US 6,598,989 B2
(45) Date of Patent: Jul. 29, 2003

(54) FACE LIGHT SOURCE MODULE STRUCTURE

(75) Inventor: Kuo-Jui Huang, Chia-Yi Hsien (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 09/948,653

(22) Filed: Sep. 10, 2001

(65) Prior Publication Data

US 2003/0063457 A1 Apr. 3, 2003

(51) Int. Cl.[7] .................................................. F21V 8/00
(52) U.S. Cl. ........................... 362/31; 362/27; 362/330; 362/800
(58) Field of Search ........................... 385/146; 349/65; 362/27, 31, 330, 555, 561, 558, 800

(56) References Cited

U.S. PATENT DOCUMENTS

| | | | | |
|---|---|---|---|---|
| 5,743,616 A | * | 4/1998 | Giuliano et al. | 362/31 |
| 6,196,691 B1 | * | 3/2001 | Ochiai | 362/31 |
| 6,231,201 B1 | * | 5/2001 | Rupp | 362/31 |
| 6,254,246 B1 | * | 7/2001 | Tiao et al. | 362/31 |
| 6,352,350 B1 | * | 3/2002 | Ma | 362/31 |
| 6,464,367 B2 | * | 10/2002 | Ito et al. | 362/31 |

* cited by examiner

*Primary Examiner*—Y. My Quach-Lee
*Assistant Examiner*—Peggy A Neils
(74) *Attorney, Agent, or Firm*—Rosenberg, Klein & Lee

(57) ABSTRACT

A face light source module structure including more than one light sources and a light guiding board. One face of the light guiding board adjacent to the light sources is defined as an incoming face. One face of the light guiding board opposite to the incoming face is defined as a first reflective face plated with a mirror face coating. One face of the light guiding board adjacent to the liquid crystal module is defined as an outgoing face. The face opposite to the outgoing face is defined as a second reflective face. The outgoing face and the second reflective face are respectively evaporated with two anti-reflection coatings. The anti-reflection coating of the outgoing face has a leakage design. After going into the light guiding board, the light of the light sources is totally reflected to project through the leakage design of the outgoing face toward the liquid crystal module.

3 Claims, 5 Drawing Sheets

FACE LIGHT SOURCE MODULE STRUCTURE

BACKGROUND OF THE INVENTION

The present invention is related to a face light source module structure in which the light guiding board is plated with mirror face coatings and anti-reflection coatings. The anti-reflection coating of the outgoing face has a leakage design. The face light source module is able to enhance the reflection efficiency within the light guiding board and the evenness of distribution of the light.

FIGS. 4 and 5 show a conventional face lighting device including a light guiding bar 8. Each of two ends of the light guiding bar 8 is provided with a point light source 81. The light guiding bar 8 has a reflective face 82 and an outgoing face 83. Multiple reflective sections 821 are arranged on the reflective face 82 at intervals. The reflective sections 821 define therebetween V-shaped channels. The light emitted from the point light source 81 is reflected and diverged by the reflective sections 821 to go out from the outgoing face 83 to a light guiding board 84. The light guiding board 84 also has a reflective face 85 having multiple reflective sections 851. The reflective sections 851 also define therebetween V-shaped channels for reflecting to a liquid crystal display panel 86.

In the above structure, the light guiding bar 8 and the light guiding board 84 are both formed with multiple reflective sections 821, 851 defining therebetween V-shaped channels for reflecting light. It is quite difficult to manufacture such reflective sections 821, 851 so that the ratio of good product is not high and the manufacturing cost as a whole will be increased.

Moreover, only the reflective faces 82, 85 of the light guiding bar 8 or light guiding board 84 are formed with the V-shaped reflective sections 821, 851 for reflecting light. Therefore, the light will partially spill from the light guiding bar 8 or light guiding board 84. Only a part of the light is reflected to the liquid crystal display panel 86. As a result, the brightness of the display panel can be hardly enhanced. In addition, when the light is reflected within the light guiding board 84, a part of the light will spill from the light guiding board 84 and only a part of the light is reflected to one side of the light guiding board 84 distal from the light guiding bar 8. Therefore, the light reflected to the liquid crystal display panel 86 is unevenly distributed.

SUMMARY OF THE INVENTION

It is therefore a primary object of the present invention to provide a face light source module structure including more than one light sources and a light guiding board. One face of the light guiding board adjacent to the light sources is defined as an incoming face. One face of the light guiding board opposite to the incoming face is defined as a first reflective face plated with a mirror face coating. One face of the light guiding board adjacent to the liquid crystal module is defined as an outgoing face. The face opposite to the outgoing face is defined as a second reflective face. The outgoing face and the second reflective face are respectively evaporated with two anti-reflection coatings. The anti-reflection coating of the outgoing face has a leakage design. After going into the light guiding board, the light of the light sources is totally reflected to project through the leakage design of the outgoing face toward the liquid crystal module. The brightness of the face light source module is increased.

It is a further object of the present invention to provide the above face light source module structure in which the light guiding board is plated with mirror face coatings and anti-reflection coatings so that the reflection efficiency within the light guiding board is enhanced and the light can be evenly reflected within the light guiding board.

It is still a further object of the present invention to provide the above face light source module structure in which it is unnecessary to process the light guiding board to form V-shaped reflective sections thereon. Therefore, the manufacturing cost is lowered and the ratio of good product is increased.

The present invention can be best understood through the following description and accompanying drawings wherein:

DETAILED DESCRIPTION OF THE PREFERRED EMBODIMENTS

Figure 1:
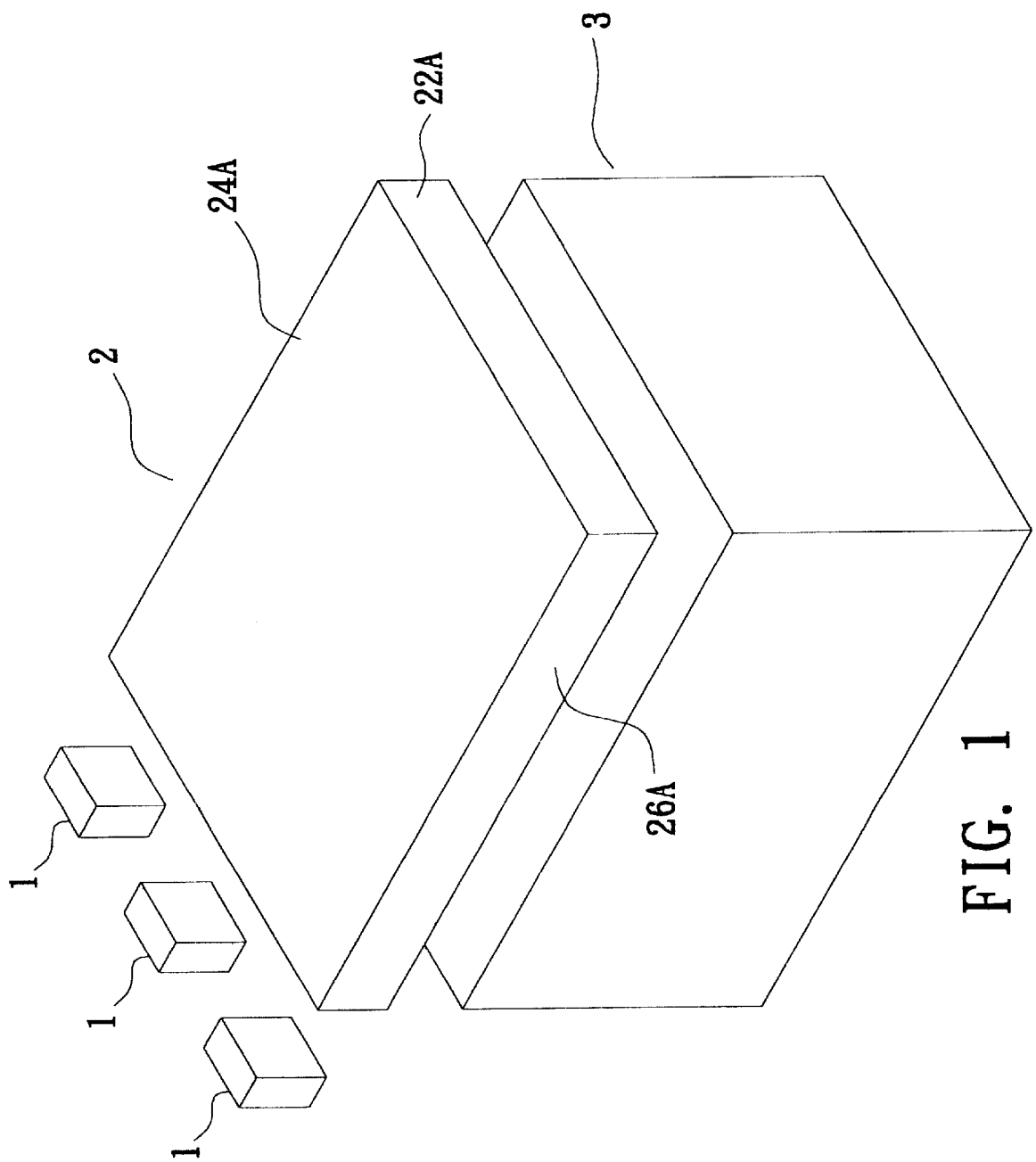
FIG. 1 is a perspective view of the present invention.
Figure 2:
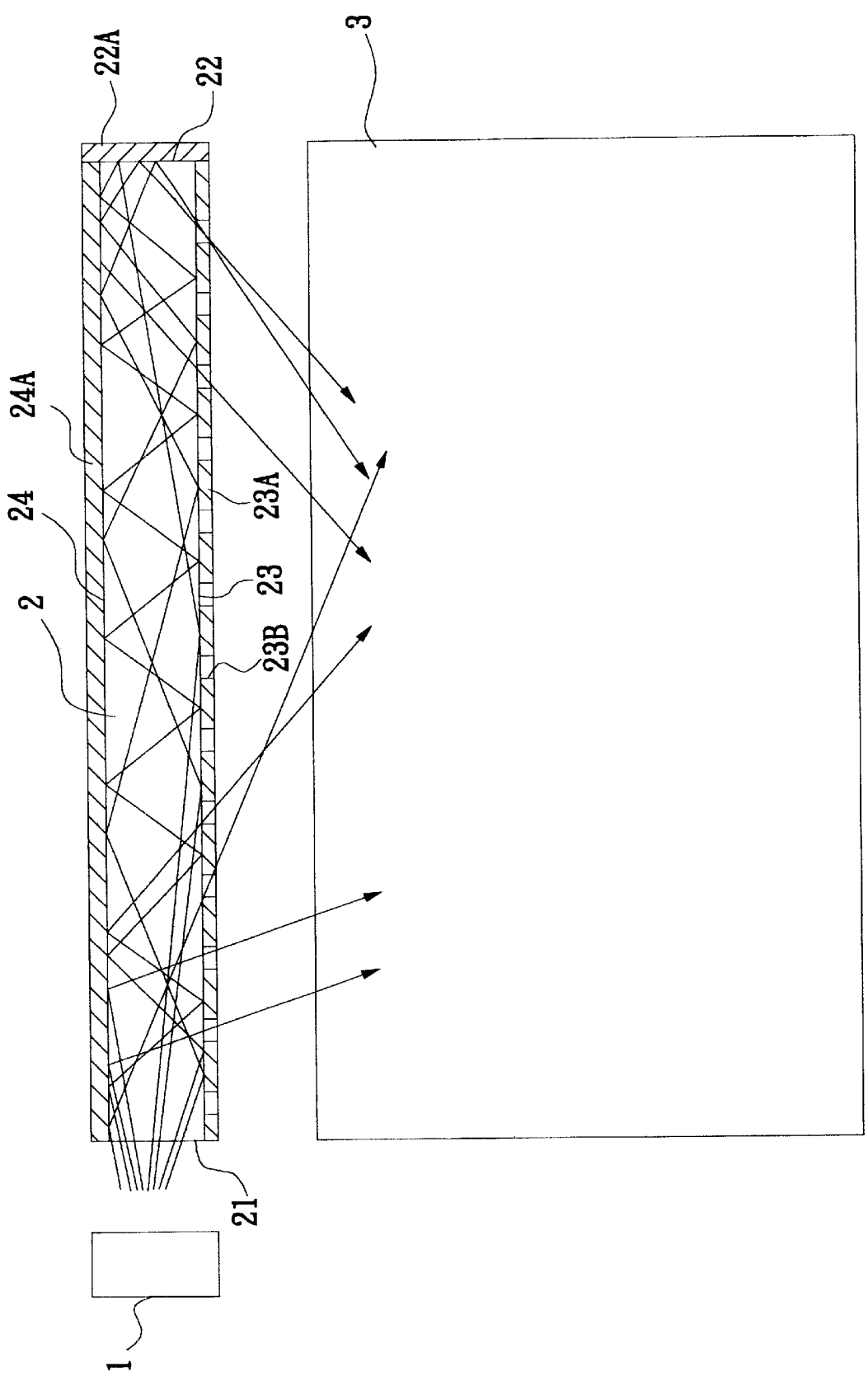
FIG. 2 is a sectional view of the present invention, showing the reflection of the light within the light guiding board.

Please refer to FIGS. 1 and 2. The face light source module structure of the present invention includes more than one light sources 1 and a light guiding board 2. In this embodiment, the light source 1 can be a light emitting diode (LED) or a cold cathode-ray tube (CCFL). In this embodiment, three light sources 1 are arranged on one side of the light guiding board 2.

One face of the light guiding board 2 adjacent to the light sources 1 is defined as an incoming face 21. One face of the light guiding board 2 opposite to the incoming face 21 is defined as a first reflective face 22. The first reflective face 22 is plated with a mirror face coating 22A. One face of the light guiding board 2 adjacent to the liquid crystal module 3 is defined as an outgoing face 23. In this embodiment, the light guiding board 2 is disposed above the top face of the liquid crystal module 3. Accordingly, the outgoing face 23 is positioned on bottom face of the light guiding board 2. The face opposite to the outgoing face 23 is defined as a second reflective face 24. The outgoing face 23 and the second reflective face 24 are respectively evaporated with two anti-reflection coatings 23A, 24A. In addition, the anti-reflection coating 23A of the outgoing face 23 has a leakage pattern 23B. The other two faces of the light guiding board 2 adjacent to the first and second reflective faces 22, 24 are respectively defined as a third reflective face 25 and a fourth reflective face 26 (not shown). The third and fourth reflective faces 25, 26 are respectively plated with two mirror face coatings 25A, 26A (mirror face coating 25A is not shown). After going into the light guiding board 2, the light of the light sources 1 is fully reflected to project through the leakage pattern 23B of the outgoing face 23 toward the liquid crystal module 3.

After the light of the light sources 1 is emitted through the incoming face 21 into the light guiding board 2 and incident upon the mirror face coatings 22A, 25A, 26A of the first, third and fourth reflective faces 22, 25, 26, the light will be totally reflected without spilling. Furthermore, when the light is reflected to the anti-reflection coatings 24A, 23A of the second reflective face 24 and the outgoing face 23, the light will be also totally reflected within the light guiding board 2. Only when the light is reflected to the leakage pattern 23B of the outgoing face 23, the light will project through the light guiding board 2 onto the liquid crystal module 3. The light can hardly spill when reflected within the light guiding board 2 so that the utility of the light is enhanced. Accordingly, the brightness of the face light source module is increased and the light can be evenly reflected to each part within the light guiding board 2 to promote the evenness of distribution of the light on the face.

According to the above structure, it is unnecessary to process the light guiding board 2 to form V-shaped reflective sections thereon. Therefore, the manufacturing cost is lowered and the ratio of good product is increased.

Figure 3:
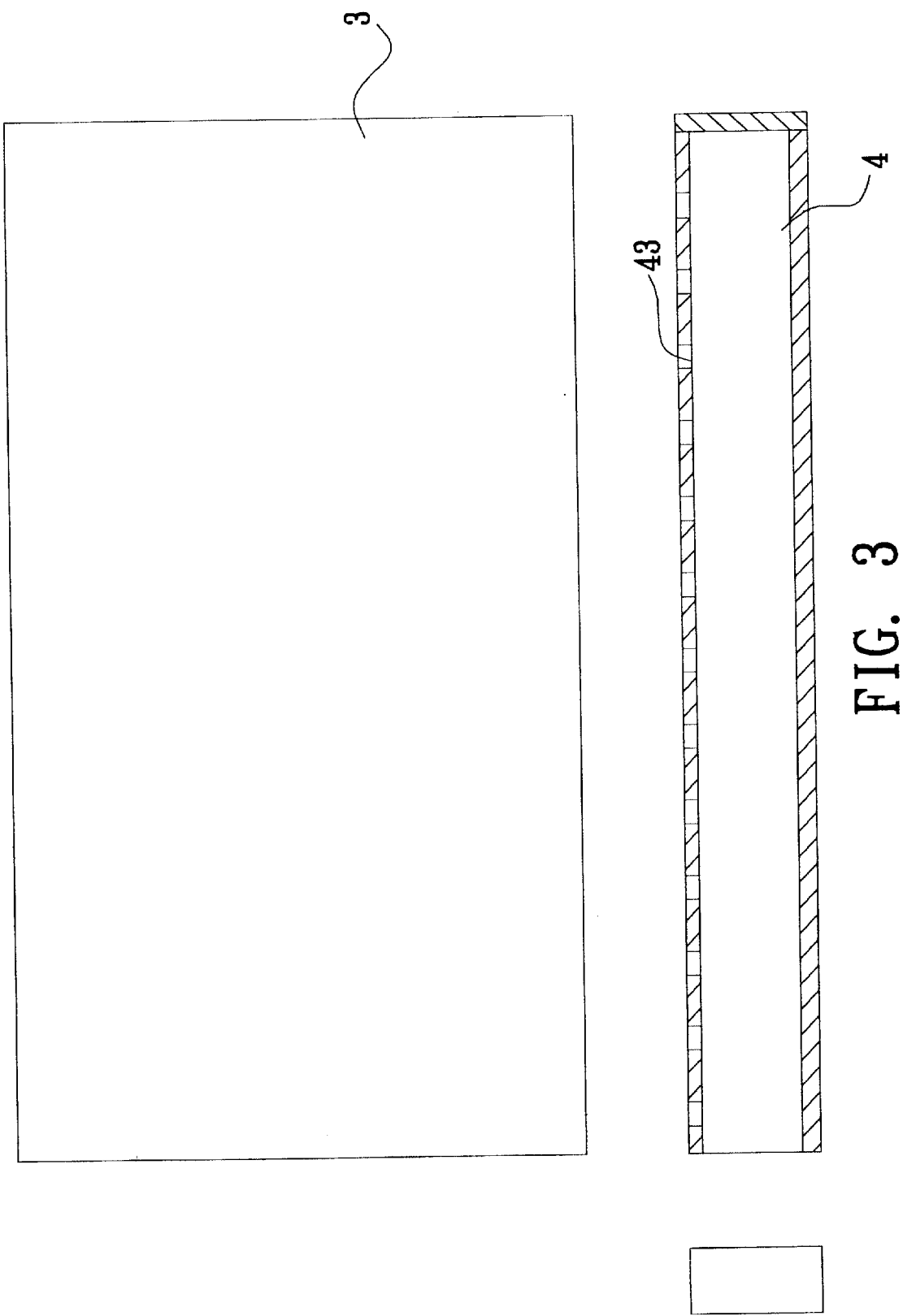
FIG. 3 is a sectional view of a second embodiment of the present invention.
Figure 4:
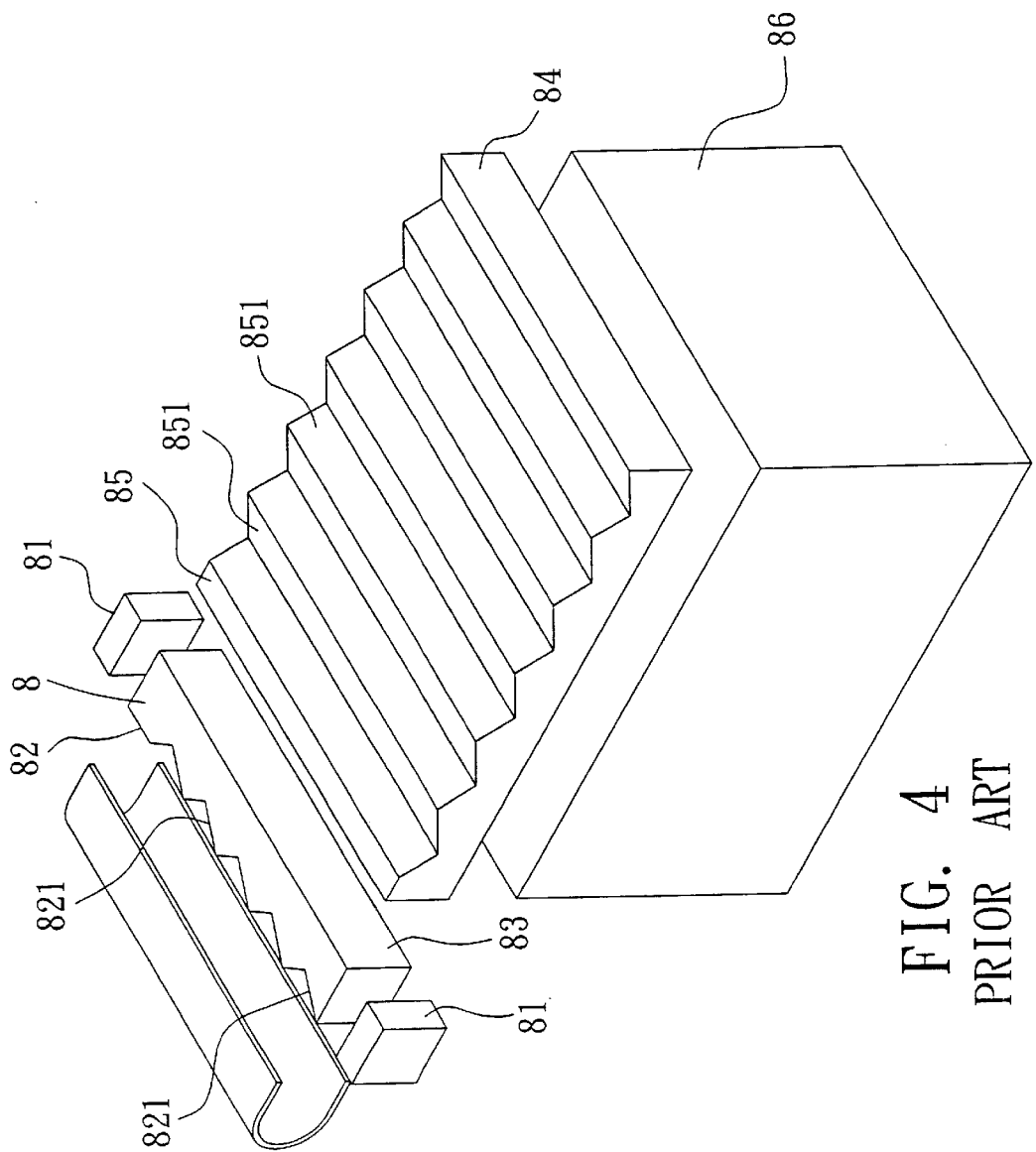
FIG. 4 is a perspective view of a conventional face lighting device.
Figure 5:
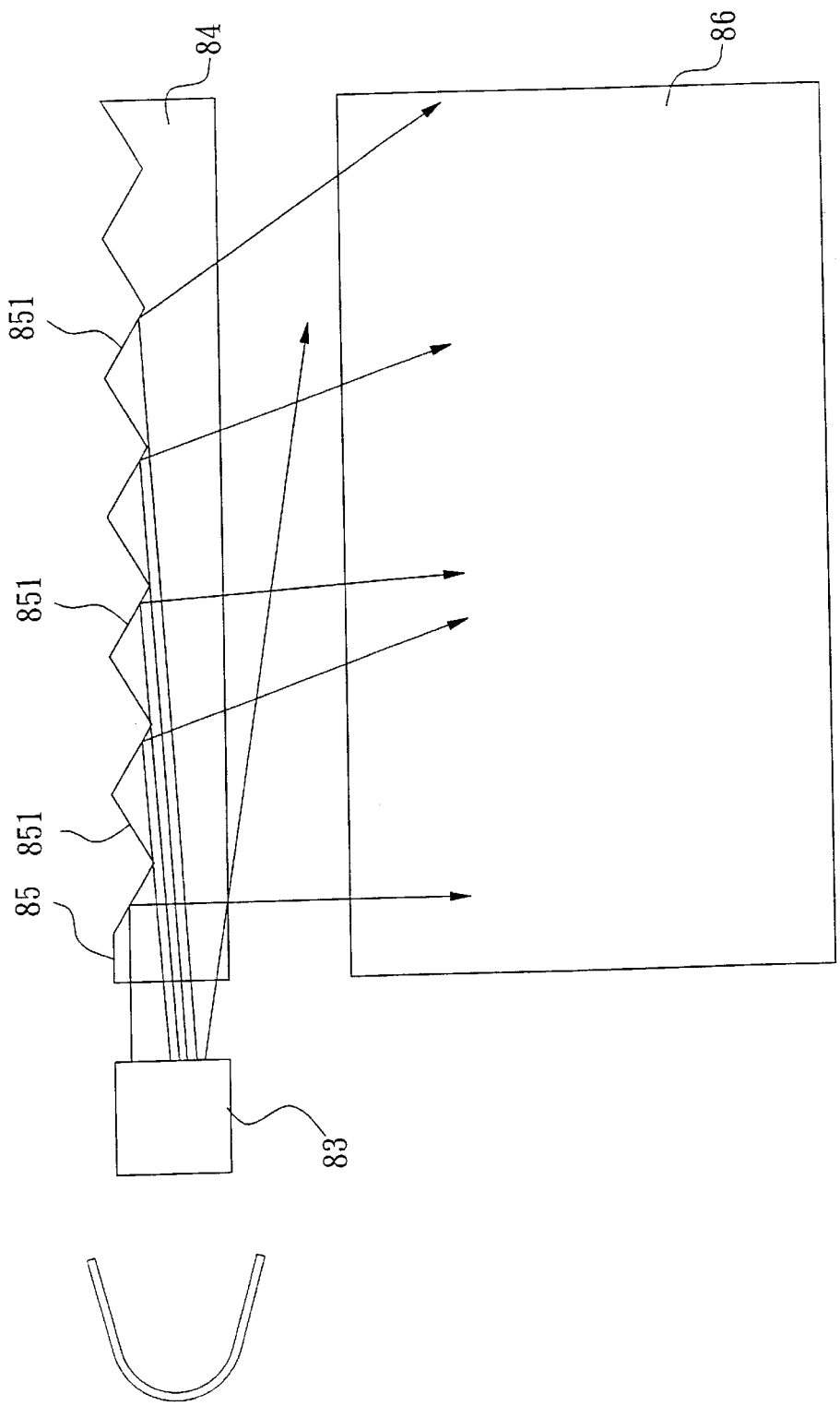
FIG. 5 shows the reflection of light of the conventional face lighting device.

FIG. 3 shows a second embodiment of the present invention, in which the light guiding board 4 is disposed under bottom face of the liquid crystal module 3. The outgoing face 43 is positioned on top face of the light guiding board 4.

The above embodiments are only used to illustrate the present invention, not intended to limit the scope thereof. Many modifications of the above embodiments can be made without departing from the spirit of the present invention.

What is claimed is:

1. A face light source module structure comprising:

more than one light source; and a light guiding board, one face of the light guiding board adjacent to the light sources being defined as an incoming face, one face of the light guiding board opposite to the incoming face being defined as a first reflective face, the first reflective face being plated with a mirror face coating, one face of the light guiding board adjacent to a liquid crystal module being defined as an outgoing face, a face opposite to the outgoing face being defined as a second reflective face, the outgoing face and the second reflective face being respectively evaporated with two anti-reflection coatings, each anti-reflection coating of the outgoing face having a leakage design, whereby after going into the light guiding board, the light of the light source is totally reflected to project through the leakage design of the outgoing face toward the liquid crystal module, each leakage design being a leakage pattern formed on a corresponding one of the two anti-reflection coatings of the outgoing face, whereby the light of the light source can pass through the leakage pattern of the outgoing face, the other two faces of the light guiding board adjacent to the first and second reflective faces being respectively defined as a third reflective face and a fourth reflective face, the third and fourth reflective faces being respectively plated with the two mirror face coatings.

2. The face light source module structure as claimed in claim 1, wherein the light sources are light emitting diodes.

3. The face light source module structure as claimed in claim 1, wherein the light sources are cold cathode-ray tube.

\* \* \* \* \*